UNITED STATES PATENT OFFICE.

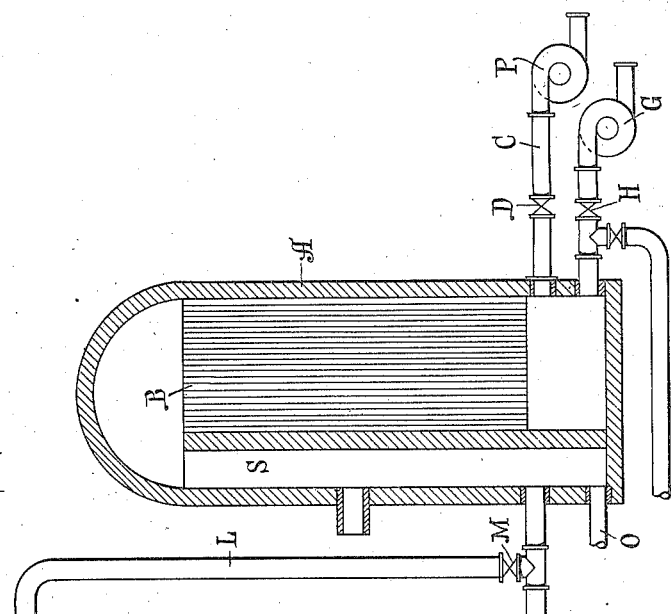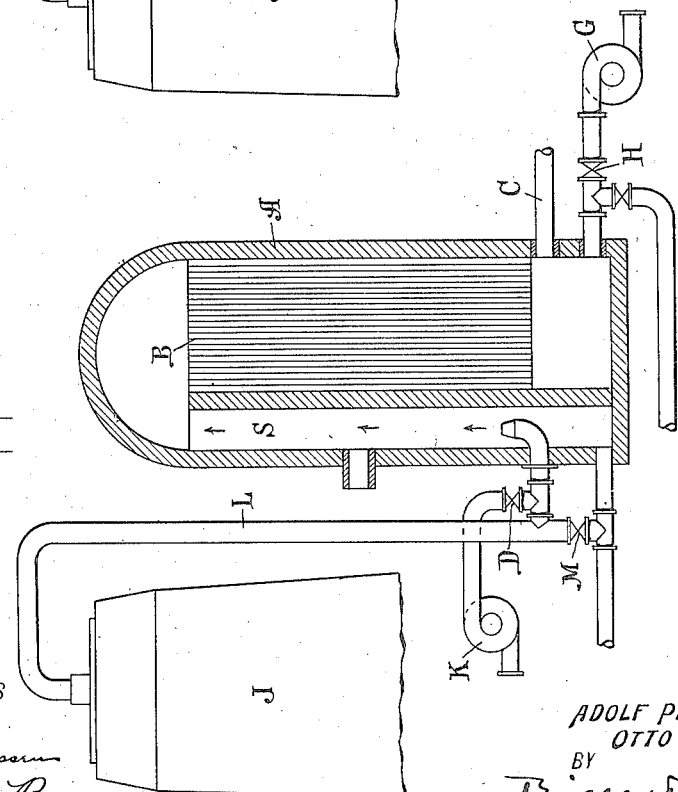

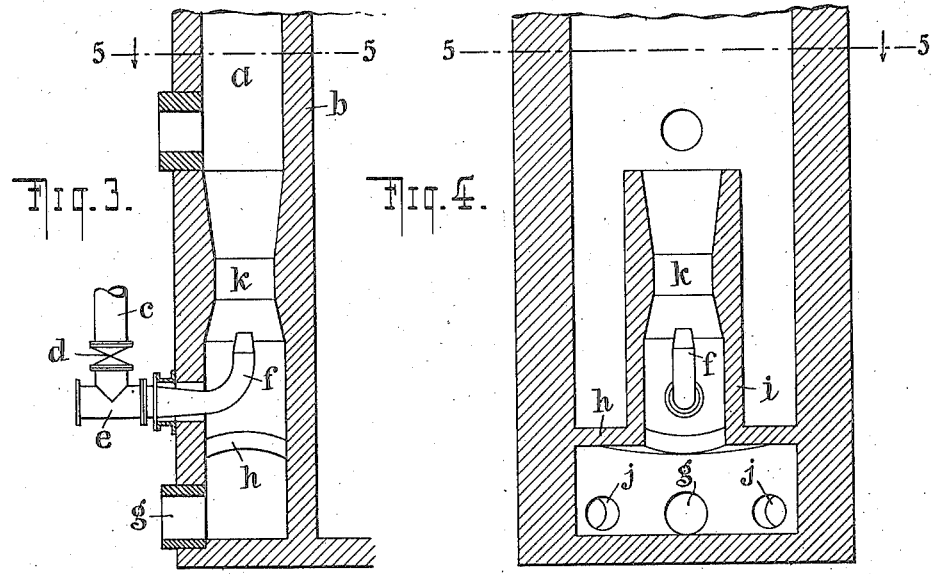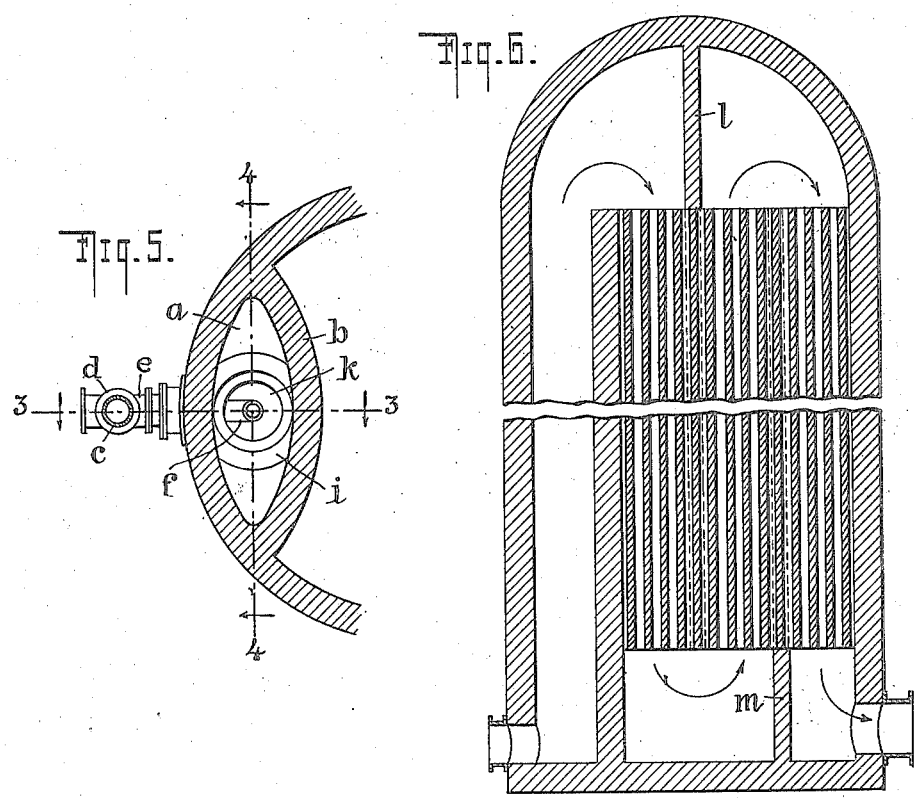

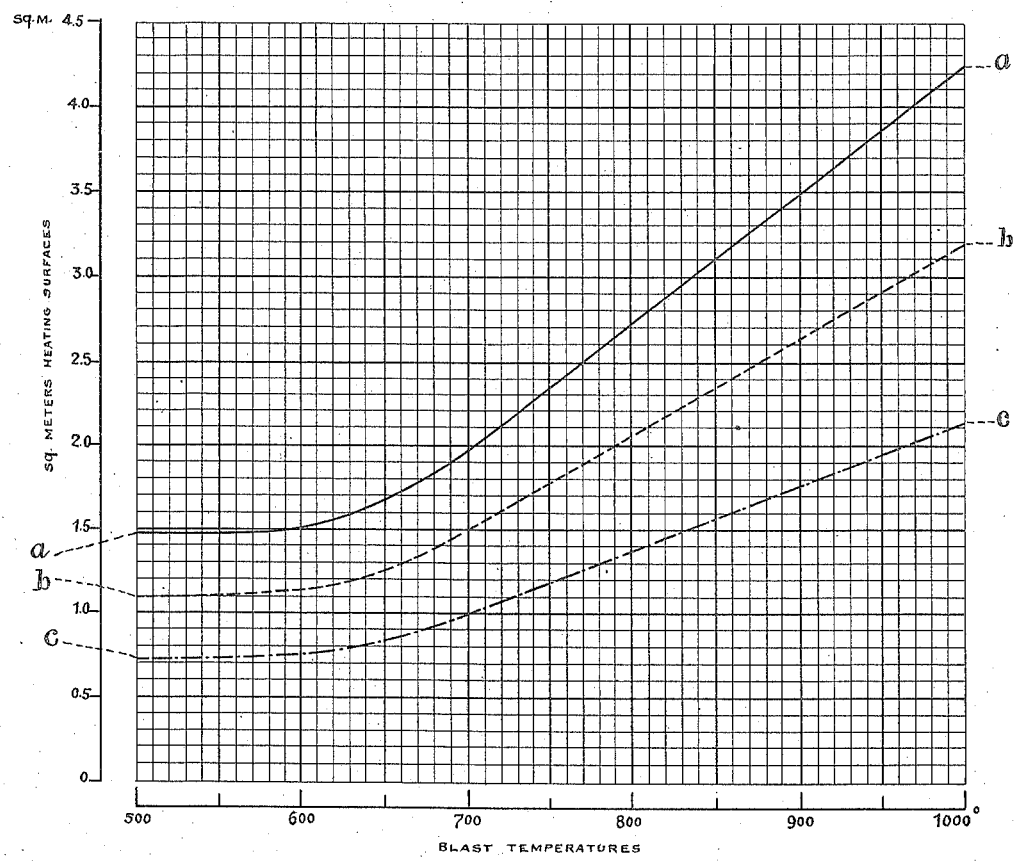

ADOLF PFOSER, OF ACHERN, AND OTTO STRACK, OF SAARBRÜCKEN, GERMANY, ASSIGN-ORS OF ONE-THIRD TO GEBRÜDER STUMM, G. M. B. H., OF NEUNKIRCHEN, SAAR, GERMANY, A FIRM.

OPERATION OF CHECKER-BRICK HEATERS.

1,257,524.  Specification of Letters Patent.  Patented Feb. 26, 1918.

Application filed August 26, 1913. Serial No. 786,808.

*To all whom it may concern:*

Be it known that we, ADOLF PFOSER and OTTO STRACK, subjects of the German Emperor, and residing, respectively, at Achern, Germany, and Saarbrücken, Germany, have invented certain new and useful Improvements in the Operation of Checker-Brick Heaters, of which the following is a specification.

Our invention relates to heaters and more particularly to a method of increasing the heat transmission in checker brick heaters for blast furnaces during the period during which the heaters absorb the heat from the hot combustion products passing through the same. This period is known as the heating period or gas period.

The operation of these checker brick furnaces, as heretofore practised, required a heating period which was considerably longer than the blast period, that is the period during which the checker brick furnace gives up to the air blast the heat absorbed during the preceding heating period. Thus in a checker brick furnace the air blast takes out of the furnace during two hours the entire heat which the furnace has absorbed during the six hour heating period, so that the heating period is three times as long as the wind or blast period. If the amount of the combustion gases sent through the checker brick furnace in the time unit during the heating period is increased, the temperature of the waste gases will increase correspondingly, thus showing that the efficiency of the heater is lessened. If the amount of combustion gases sent through the heater in the time unit during the heating period is still further increased, the temperature of the waste gases will be reduced again and the reduction will continue, thus proving that after a certain point, the efficiency of the heater continuously increases. This may be readily explained by the fact that as long as the combustion products travel with low speed through the heater, the friction on the walls of the several checker brick channels is rather small so that the whirls will occur only along the walls of the channels, while the inner core, that is to say the inner molecules of the current of combustion products, does not come into contact with the heating surfaces, but merely passes through the heater without giving up its heat. If the speed of the combustion gases is slightly increased, the whirls on the walls of the channels will become slightly larger as a result of the increased friction, but not sufficiently to cause an increase in the amount of heat transferred to each square foot of heating surface. The result is that the temperature of the waste gases increases. If, however, the speed of the combustion gases is increased to such an extent that the friction on the walls of the channels, and as a result thereof the whirls, become so large that even the gas molecules of the inner core of the gas current are subjected to violent motion, then an entirely different form of heat transference takes place, because in that case even the innermost gas molecules come into contact with the heating surfaces and become thus capable of transferring heat.

As a result of the increased efficiency brought about by the increase in the speed of the combustion gases, great economical advantages are obtained wherever our method is used.

Experiments made with a checker brick heater have shown that the adoption of our method actually results in economical advantages, provided the speed of the combustion gases is increased to at least two and a half times the amount of the ordinary speed. If the speed of the combustion gases in checker brick heaters is increased during the gas period to three times the amount of the customary speed and more, the gas period may be shortened more and more, whereby the efficiency of the heater is correspondingly increased.

Our invention finds expression in its simplest respect in the method of increasing the heat transmission in a checker brick heater during the heating period by increasing the speed of the combustion products in the heater to such an extent that the gas period does not exceed one and a half times the length of the blast period, while in the old heating methods the gas period amounts to at least twice the length of the blast period. In the old method of heating a blast furnace is provided with at least three checker brick heaters, two for the gas period and one for the blast period; that is, because the gas period lasts at least twice as long as the blast period.

Where five checker brick heaters are provided for a blast furnace it is possible, according to the present method of heating, to have three heaters heated contemporaneously while a blast period prevails in two heaters in parallel connection, so that each of the latter two heaters during the time unit is traversed by only one half of the total amount of air required by the blast furnaces. Under these conditions it is customary to heat the checker brick heaters for three hours and to permit the blast period to continue for two hours. At first glance it would seem as if the proportion of gas period to blast period was 3:2 or 1.5:2, which would seem to indicate that the proportion claimed by us was old. The conclusion, however, is erroneous. For the purpose of comparing different methods of heating, it is necessary to consider as actual blast period the period during which the total amount of air required for the operation of the blast furnace would take up from a single checker brick heater the entire amount of heat transferred to said heater during the heating period. Thus if blast period prevails in more than one heater in parallel connection, the blast period with reference to one heater is equal to the actual blast period divided by the number of the parallel heaters in which the blast period prevails. In the above example the proportion of gas period to blast period, as it must be considered in making a comparison between the old and our new method of heating is 3:1 and not 3:2.

In our new method of heating there may be cases where three or five checker brick heaters are provided for two furnaces, and where blast period prevails always in a group of two parallel heaters. In these cases, however, the entire amount of air for one furnace passes through each of these two heaters, so that in comparing the gas period with the blast period, the entire length of the blast period is to be considered without dividing the same by the number of heaters in which blast period prevails. In these cases we, therefore, would have the proportion of gas period to blast period of 1:2 and 1.5:1 respectively.

Our new method is likewise useful where the old proportion of gas period to blast period, that is to say 2:1 or 3:2, is retained. In these cases the temperature of the air current is to be increased, so that a saving in fuel (coke) will be obtained. According to our new method this can be done without enlarging the checker brick heater, while, according to the old methods it was necessary to lengthen the heating period in order to obtain an increase in the temperature of air which meant that the number of the heaters had to be increased correspondingly. In order to make this perfectly clear, we have graphically indicated in Figure 7 the amount of checker brick heating surface necessary for transferring thousand heat units to the blast at different temperatures of the blast.

The increase in the speed of the combustion products characteristic for our new method is obtained by mechanically introducing relatively large amounts of gas and air into the heaters by means of bellows, ventilators or other suitable means.

If desired, gas and air may be separately introduced into the heaters, one or both of these media (each one separately) may be pressed into the heaters, or the waste gases may be sucked into the heaters by artificial suction, or the air may be pressed into the heaters by means of a nozzle thereby sucking into the heaters the gas necessary for the combustion, or vice versa, the gas may be pressed into the heaters whereby the combustion air is sucked into the same.

The accompanying drawings are merely illustrative of instrumentalities suitable for carrying out our method and do not form part of the present application.

In the drawings Figs. 1 and 2 are diagrammatic illustrations of two methods of operation, Figs. 3, 4 and 5 illustrate sections through a part of one special form of heater which part serves for introducing gas and air into the heater; Fig. 3 being a section on lines 3—3 of Fig. 5; Fig. 4 a section on lines 4—4 of Fig. 5 and Fig. 5 a section on lines 5—5 of Figs. 3 and 4. Fig. 6 is a section through a modified form of heater and Fig. 7 is a diagram of curves. In the drawings the heater is designated as A containing the usual checker brick filling B and an outlet C, which communicates with the stack. The air to be heated in the heater A is propelled by the blower G through the valve connection H into the heater A. The hot gas from the blast furnace J is admitted to the combustion channel S of the heater A, where it is mixed with the necessary amount of combustion air having been propelled by the blower K and the valve D into the said combustion channel S and the ignition of this mixture takes place along the hot checker bricks. Thereupon the hot combustion products pass through the checker brick filling B, where they give up their heat and escape through the outlet pipe C.

Fig. 2 differs from Fig. 1 in employing a suction ventilator P which sucks the waste gases through the heater A propelling them toward the stack. Hereby the gas enters through the pipe connection L and through the gas valve M into the combustion channel S, while the combustion air enters through the opening O.

In the three Figs. 3, 4, and 5, the heater A is shown as having a spaced chamber or flue $a$ formed between the wall $b$ and the wall of the heater. Through this space $a$ the gases are suitably drawn as shown in Fig. 3. A ventilator or blower presses the air through the pipe $c$, the valve $d$, the T-connection $e$ and the nozzle $f$ into the flue $a$. Thus the hot gases of the blast furnace are sucked into the flue $a$ through the opening $g$. For the purpose of securing an efficient draft, we supply a support $h$ which carries the supplemental cylinder $i$. The arch $h$ is placed immediately below the point where the nozzle $f$ enters the cylinder $i$ and closes the major portion of the lower flue, thereby creating a large chamber at the bottom of said flue which causes the gases entering said flue to have a lower velocity, so that the losses due to friction are avoided. This chamber also enables a ready removal, through the opening $j$, of the solid particles separating out of the gases. The cylinder $i$ which rests upon the arch $h$ serves to create a vacuum when the air enters with great force through the nozzle $f$. As a result of this vacuum the hot gases are sucked into the cylinder and are forced to pass through the contracted portion $k$ of the cylinder $i$. Here the hot gas is thoroughly mixed with the air and then burned. By the employment of the contracted portion $k$, the hot gases are not only thoroughly mixed, but are also whirled together with the result that a rapid and complete combustion takes place. In order that losses due to friction shall not be too large, the contracted portion $k$ is comparatively short. The effect will be exactly the same if the inlet connections $c$, $d$, $e$ and $f$ are used for the purpose of introducing the hot gases, while the air is sucked through the aperture $g$. In case it is not desired to employ a nozzle, gas and air may be introduced into the heater either by means of their own blowers or ventilators or by creating artificial suction.

As the object of the invention is to increase the speed of the hot gases passing through the heater, this result may be also in part brought about by decreasing the size of the passages through the checker work of the heater. A narrowing of these passages can be brought about by the employment of appropriately located partition walls such as $l$ and $m$ shown in Fig. 6. The introduction of these partitions causes the hot gases to pass rapidly up and down through separate parts of the checker work. Such a construction results in forcing the gases through substantially narrow passages and thereby increases the speed of the combustion products in the heater. This also materially increases the amount of heat transferred per cubic foot of heated surface per hour. Such a construction also decreases very materially the temperature of the waste gases, whereby waste is prevented and economy in gas effected. The partitions $l$ and $m$ of Fig. 6 are arranged not with the idea of merely lengthening the passage of the combustion gases through the heater but in such a way that the sectional area of each of the passages shall be so restricted as to cause an increase of speed of the gases passing through the heater. The construction illustrated in Fig. 6 is adopted for such heaters whose vertical passages do not communicate with each other. In case of heaters where the passages do communicate with each other the partitions $l$ and $m$ must be carried through the entire checker work as indicated in the dotted lines of Fig. 6.

In Fig. 7, there is graphically indicated the amount of checker brick heating surface necessary for transferring a thousand heat units to the blast at different temperatures of the blast.

In this drawing curve $a$ indicates the minimum checker brick heating surface required in the various styles of heaters used in Germany and in the United States and operated, according to the old heating method, while curve $b$ indicates the maximum amount of heating surface required in our new heating method for obtaining the same blast temperatures. The curve $b$ limits the scope of our invention, that is to say, everything falling on this curve $b$ or below the same belongs within the scope of our present invention. Thus the curve $c$ which is far below the curve $b$ has actually been obtained in practical operation with our new method. The drawing shows that in order to obtain a blast temperature of 800°, 2.7 square meter heating surface is necessary in the old heating method to transfer 1000 heat units, while according to our new method not more than 2.1 square meter heating surface is required, and as little as 1.4 square meters have been found to be sufficient.

By our invention we accomplish a certain saving in heating surface, that is to say, a saving in the cost of the construction plant. Moreover we effect a saving in fuel (gas), because the number of the heaters will be smaller as a result of the shortening of the gas period and thus the losses due to radiation are reduced. Moreover, the loss in the waste gases will become smaller which again means a saving in gas. On the other hand we may use the same amount of heating surface as used in the old methods, in which case we obtain with the same gas consumption a considerable increase in the amount of heat transferred to each square foot of heating surface during one hour to the cold blast and thus a considerable increase in the temperature of the heated blast. This means a saving in coke and an increase in the production of pig iron.

We claim:

1. The method of transferring heat from hot gases to solid surfaces which consists in passing such gases through a confined chamber at great speed and setting up violent whirling motions in the gases during their passage through said chamber until hot particles of the inner core of the gas column are brought into frictional contact with the walls of the chamber.

2. The method of transmitting heat in checker brick heaters for hot blast furnaces which consists in mechanically introducing and passing through the heaters during the gas period, gas and air in volumes greatly in excess of corresponding volumes of the hot gases when passing directly from the furnace through the heater to the stack.

3. The method of heating checker brick which consists in greatly increasing the velocity of the combustion product within the stove by mechanically introducing into and passing through the stove during the gas period blast furnace hot gas and supplemental quantities of air in volumes greatly in excess of corresponding volumes of hot gas when passing directly from the furnace through the heater to the stack.

4. The process of operating heaters which consists in subjecting the hot gases during their passage through the heaters to a violent agitation by means of a greatly accelerated secondary velocity imparted to the gases, causing the inner gas particles of the hot gases to come into contact with the heating surfaces of the heater and to give off heat to them.

5. The process of operating checker work heaters of the regenerative type which consists in causing an intense agitation of the gases in the heaters by greatly accelerating the speed of the hot gases through the heaters until the inner gas particles of the gases come into contact with the heating surfaces and give off heat to them.

6. The process of operating checker work heaters of the regenerative type which consists in supplying hot gases from the blast furnace to the heater and in imparting to said hot gases during their passage through the heater a velocity greatly in excess of the speed of the gases as they leave the furnace and so agitating the said hot gases in said heaters that the inner particles thereof come into contact with the heating surface of the heater and give off heat thereto.

7. The process of operating checker work heaters of the regenerative type which consists in whirling and agitating the hot gases in the heater during the gas period by means of a great acceleration of the gases so great as to bring the inner particles of the hot gases into contact with the heating walls.

8. The process of operating heaters of the regenerative type which consists in violently agitating the hot gases by greatly accelerating the velocity of the hot gases during passage through the heaters by means of auxiliary propelling means, the agitation being such that the inner gas particles of the hot gases come into contact with the heating surfaces and give off heat to them.

9. The process of operating heaters of the regenerative type which consists in forcing the hot gases and combustion air through the heaters during the gas period by means of auxiliary propelling means and greatly increasing the normal velocity of the hot gases to such an extent that the inner gas particles of the hot gases come into contact with the heating surfaces and give off heat to them.

10. The process of operating heaters of the regenerative type which consists in forcing the hot gases and combustion air through separate channels into a common mixing chamber in the heaters at least one of the two gases being introduced at high velocity, said mixed gases being whirled and agitated during their passage through the heaters by a great acceleration of the speed of the hot gases, the agitation being so great that the inner gas particles of the hot gases come into contact with the heating surfaces and give off heat to them.

In testimony whereof we affix our signatures in presence of two witnesses.

ADOLF PFOSER. [L. S.]
OTTO STRACK. [L. S.]

Witnesses:
JOSEPH ROHMER,
JOHN R. HARDIN.